(12) United States Patent
Caruso

(10) Patent No.: US 8,136,831 B1
(45) Date of Patent: Mar. 20, 2012

(54) BABY STROLLER WITH ROTATING SEAT

(76) Inventor: Roger Caruso, Nantucket, MA (US)

( * ) Notice: Subject to any disclaimer, the term of this patent is extended or adjusted under 35 U.S.C. 154(b) by 60 days.

(21) Appl. No.: 12/848,616

(22) Filed: Aug. 2, 2010

(51) Int. Cl.
*B62B 7/00* (2006.01)
(52) U.S. Cl. .................. 280/642; 280/47.35; 280/47.38; 280/47.39; 280/47.4; 280/648; 280/649; 280/650
(58) Field of Classification Search ............ 280/33.993, 280/47.38, 639, 642, 643, 644, 647, 648, 280/649, 650, 658
See application file for complete search history.

(56) References Cited

U.S. PATENT DOCUMENTS

| | | | |
|---|---|---|---|
| 3,874,690 A | | 4/1975 | Marrone |
| 4,365,819 A | * | 12/1982 | Bart .......................... 280/47.41 |
| D566,629 S | | 4/2008 | Taylor |
| 7,364,183 B2 | * | 4/2008 | Lee ............................... 280/642 |
| 2004/0239062 A1 | | 12/2004 | Lan |
| 2006/0237932 A1 | | 10/2006 | Moore, II |
| 2007/0052271 A1 | | 3/2007 | Lin et al. |

* cited by examiner

*Primary Examiner* — J. Allen Shriver, II
*Assistant Examiner* — James Triggs
(74) *Attorney, Agent, or Firm* — Kyle Fletcher

(57) ABSTRACT

The baby stroller with rotating seat involves a baby seat that rotates about the baby stroller in proportion to the rate of travel of the baby stroller. The baby seat is encircled by a cylindrical enclosure, and is optionally covered by an umbrella that can be tilted. The baby seat is rotated by a rotating means that is in mechanical connection with at least one stroller wheel. A seat release is included to adjust the height of the baby seat with respect to the baby stroller and of which engages or disengages from the rotating means. Optional storage means are included about the baby stroller.

17 Claims, 4 Drawing Sheets

BABY STROLLER WITH ROTATING SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of baby strollers, more specifically, a baby stroller that has a rotating seat and an umbrella.

B. Discussion of the Prior Art

As a preliminary note, it should be stated that there is an ample amount of prior art that deals with baby strollers. As will be discussed immediately below, no prior art discloses a baby stroller wherein the seat can rotate as the stroller is pushed, and of which includes a rotating means to rotate the baby seat that can be engaged or disengaged to either rotate or not rotate the baby seat, and of which includes a cylindrical enclosure that extends vertically to encircle the baby seat, and of which further includes an optional umbrella to cover the baby seat.

The Lee Patent (U.S. Pat. No. 7,364,183) discloses a seat rotating device for a baby stroller that lets a user adjust the direction and angle of the baby seat. However, the seat rotating device does not rotate the baby seat continuously and in proportion to the rate of travel of the baby stroller, and also does not include a cylindrical enclosure that encircles the baby seat.

The Moore, II Patent Application Publication (U.S. Pub. No. 2006/0237932) discloses a baby stroller that includes a rotatable shield and a telescopic seat. However, the baby stroller does not include a baby seat that is encircled by a cylindrical enclosure and of which the baby seat is not capable of continuous rotational movement that is in proportion to the movement of the baby stroller.

The Lin et al. Patent Application Publication (U.S. Pub. No. 2007/0052271) discloses a rotatable seat structure for a cart. However, the rotatable seat structure is not capable of continuous rotational movement that is in proportion to the movement of the adjoined cart.

The Marrone Patent (U.S. Pat. No. 3,874,690) discloses a rotatably mounted baby stroller seat that includes a cover member. However, the baby stroller seat requires the baby to selectively rotate him/herself about the baby seat as opposed to a rotating means that automatically rotates the baby seat in proportion to the speed of the baby stroller. Additionally, the baby stroller does not include a cylindrical enclosure that extends vertically to encircle the baby seat.

The Taylor Patent (U.S. Pat. No. Des. 566,629) illustrates a design for a stroller, which does not depict a rotating baby seat and cylindrical enclosure.

The Lan Patent Application Publication (U.S. Pub. No. 2004/0239062) discloses a rotatable seat for a baby stroller. However, the rotatable seat does not continuously rotate in proportion to the rate of movement of the stroller, and does not include an optional umbrella and cylindrical enclosure that encircles the baby seat.

While the above-described devices fulfill their respective and particular objects and requirements, they do not describe a baby stroller wherein the seat can rotate as the stroller is pushed, and of which includes a rotating means to rotate the baby seat that can be engaged or disengaged to either rotate or not rotate the baby seat, and of which includes a cylindrical enclosure that extends vertically to encircle the baby seat, and of which further includes an optional umbrella to cover the baby seat. In this regard, the baby stroller with rotating seat departs from the conventional concepts and designs of the prior art.

SUMMARY OF THE INVENTION

The baby stroller with rotating seat involves a baby seat that rotates about the baby stroller in proportion to the rate of travel of the baby stroller. The baby seat is encircled by a cylindrical enclosure, and is optionally covered by an umbrella that can be tilted. The baby seat is rotated by a rotating means that is in mechanical connection with at least one stroller wheel. A seat release is included to adjust the height of the baby seat with respect to the baby stroller and of which engages or disengages from the rotating means. Optional storage means are included about the baby stroller.

It is an object of the invention to provide a baby stroller that has a rotating seat such that the child or infant is continuously rotating when the stroller is pushed forwards or backwards.

A further object of the invention is to provide an umbrella that is an accessory that can cover the baby seat to protect the infant or child from the elements.

A further object of the invention is to provide an umbrella that can be rotated and tilted to adjust for changing conditions.

A further object of the invention is to provide a rotating means that rotates the baby seat on said stroller.

A further object of the invention is to provide a seat release that adjusts the height of the baby seat and of which engages or disengages the rotating means with respect to the baby seat.

A further object of the invention is to include at least one storage means on the baby stroller.

These together with additional objects, features and advantages of the baby stroller with rotating seat will be readily apparent to those of ordinary skill in the art upon reading the following detailed description of presently preferred, but nonetheless illustrative, embodiments of the baby stroller with rotating seat when taken in conjunction with the accompanying drawings.

In this respect, before explaining the current embodiments of the baby stroller with rotating seat in detail, it is to be understood that the baby stroller with rotating seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the baby stroller with rotating seat.

It is therefore important that the claims be regarded as including such equivalent construction insofar as they do not depart from the spirit and scope of the baby stroller with rotating seat. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
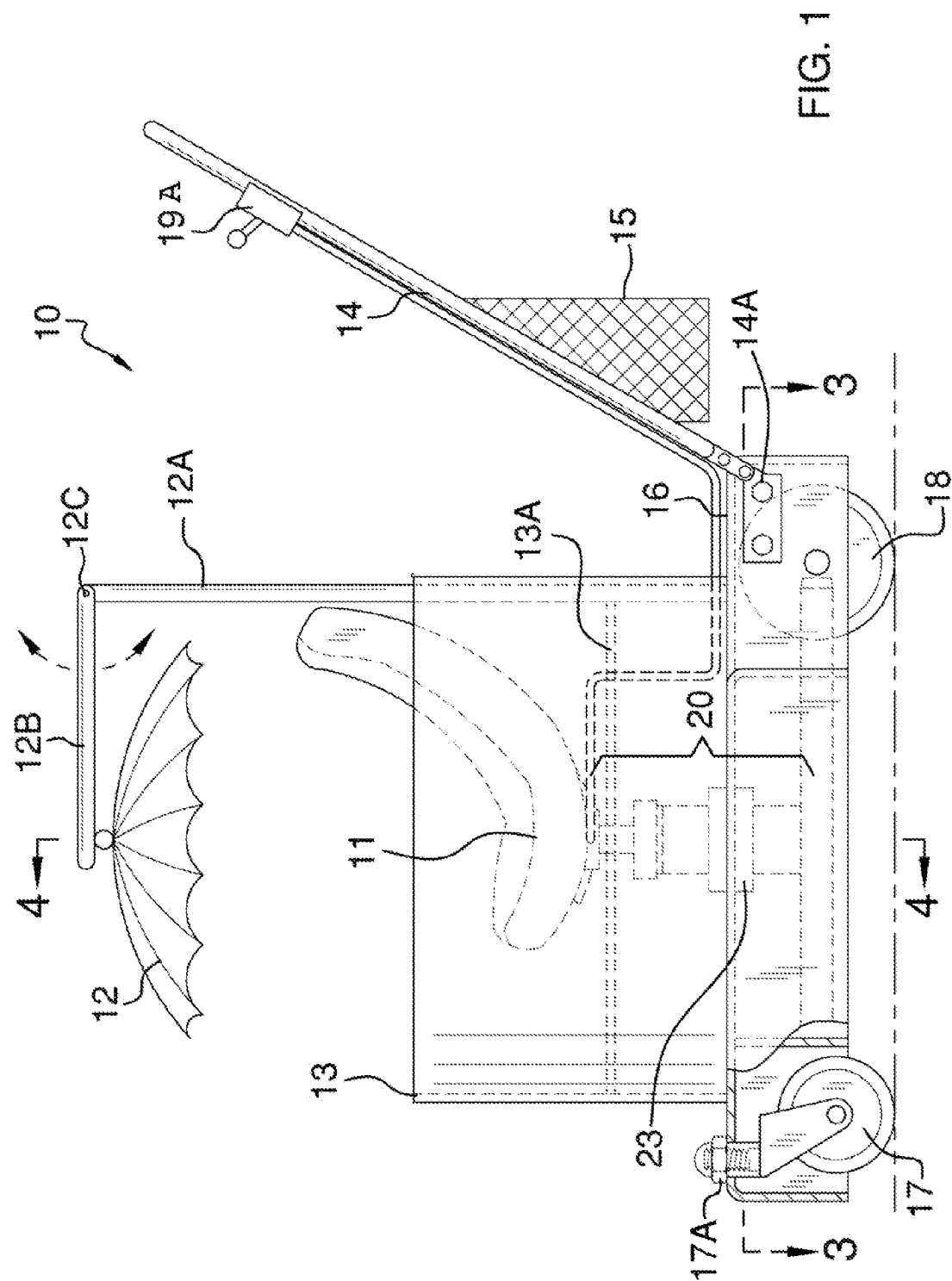
FIG. 1 illustrates a side view of the baby stroller with rotating seat with arrows indicating tilting of the umbrella and hidden lines depicting the rotating means and the baby seat along with detail as to the utility mesh bag that hangs from below the handle bar.
Figure 2:
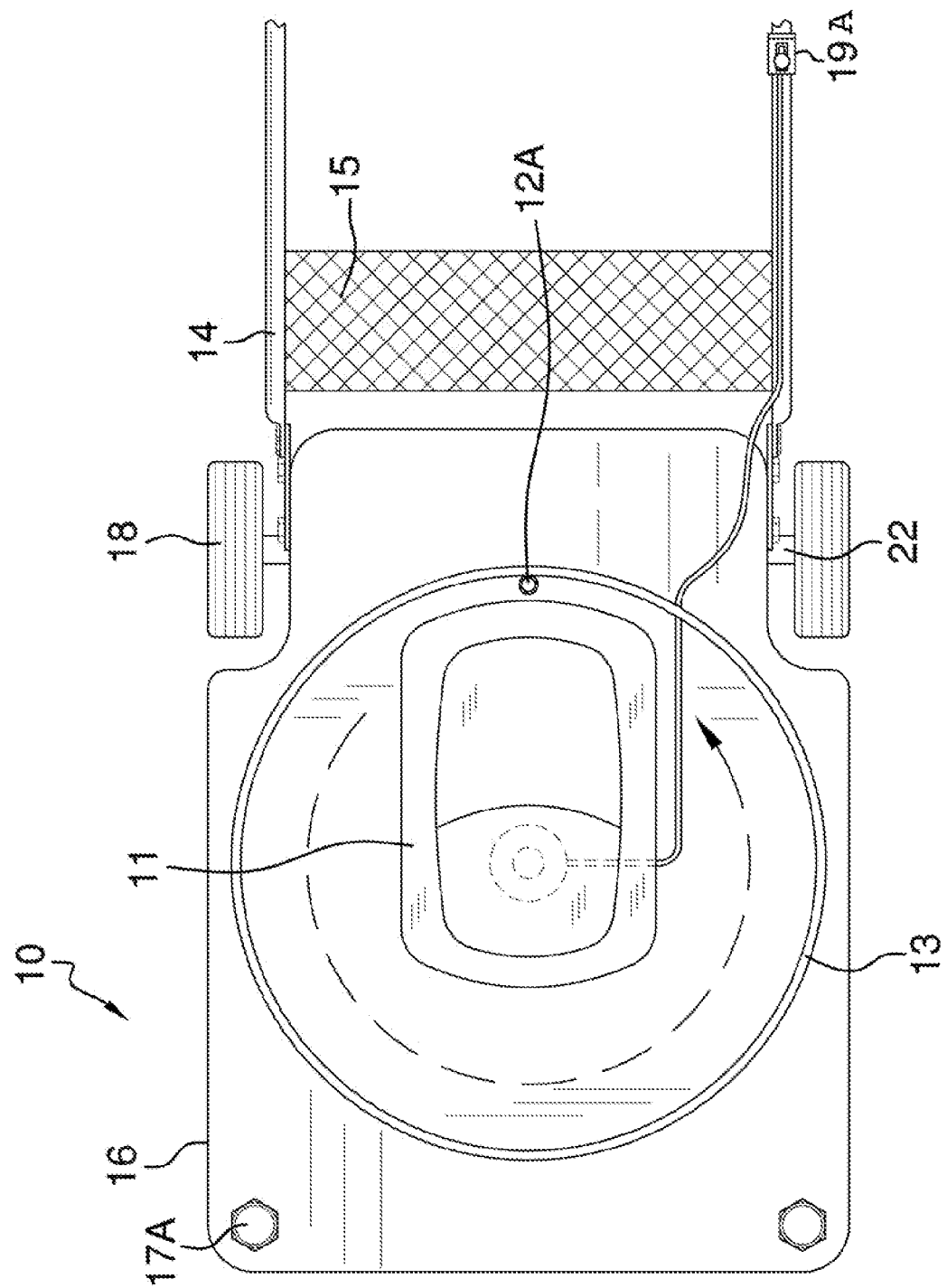
FIG. 2 illustrates a top view of the baby stroller with rotating seat and detailing the seat release, umbrella mount, shelf, and a rotating arrow depicting rotation of the baby seat.
Figure 3:
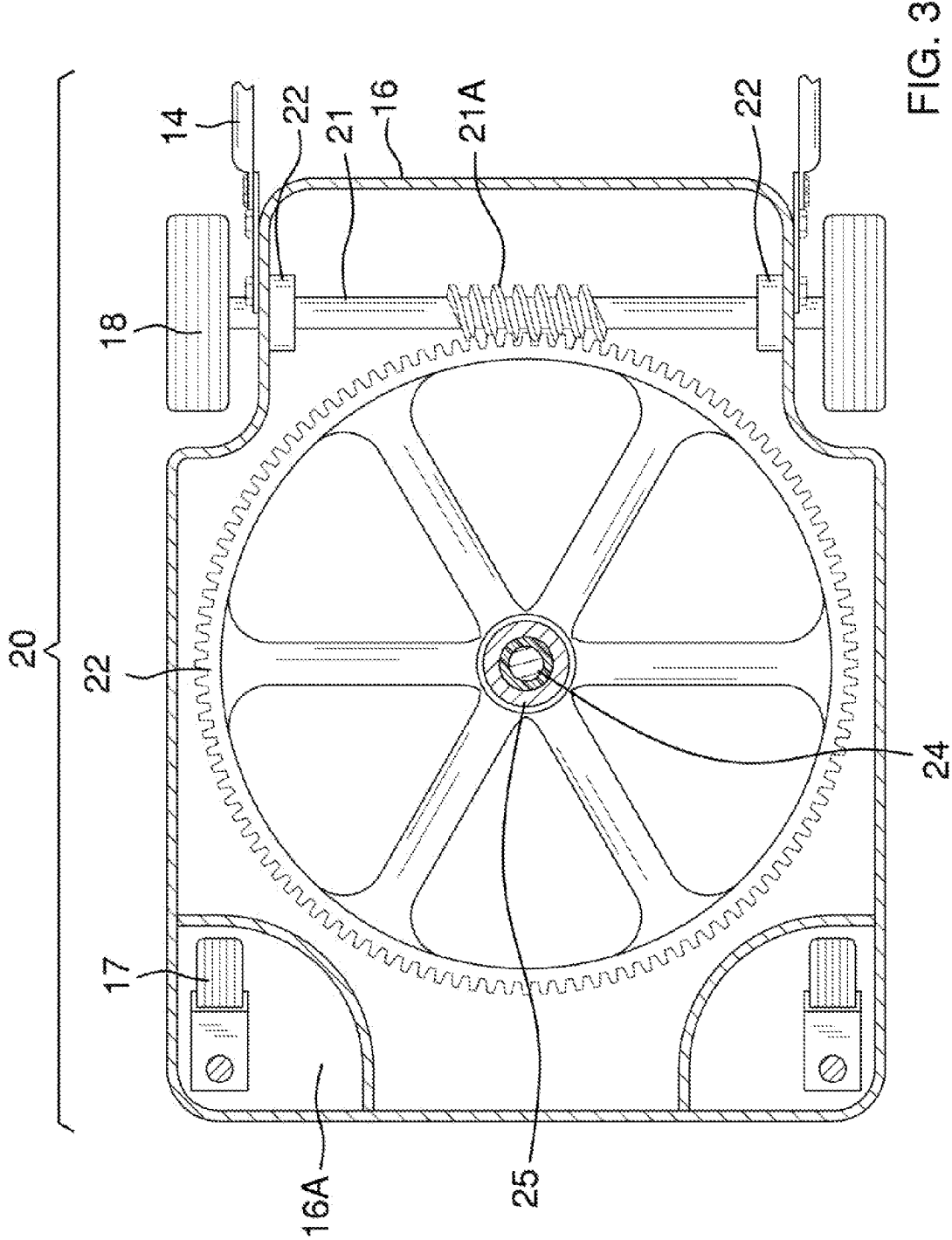
FIG. 3 illustrates a bottom view detailing the rotating means including the worm drive gear, rear axle, seat shaft, and rear wheels.
Figure 4:
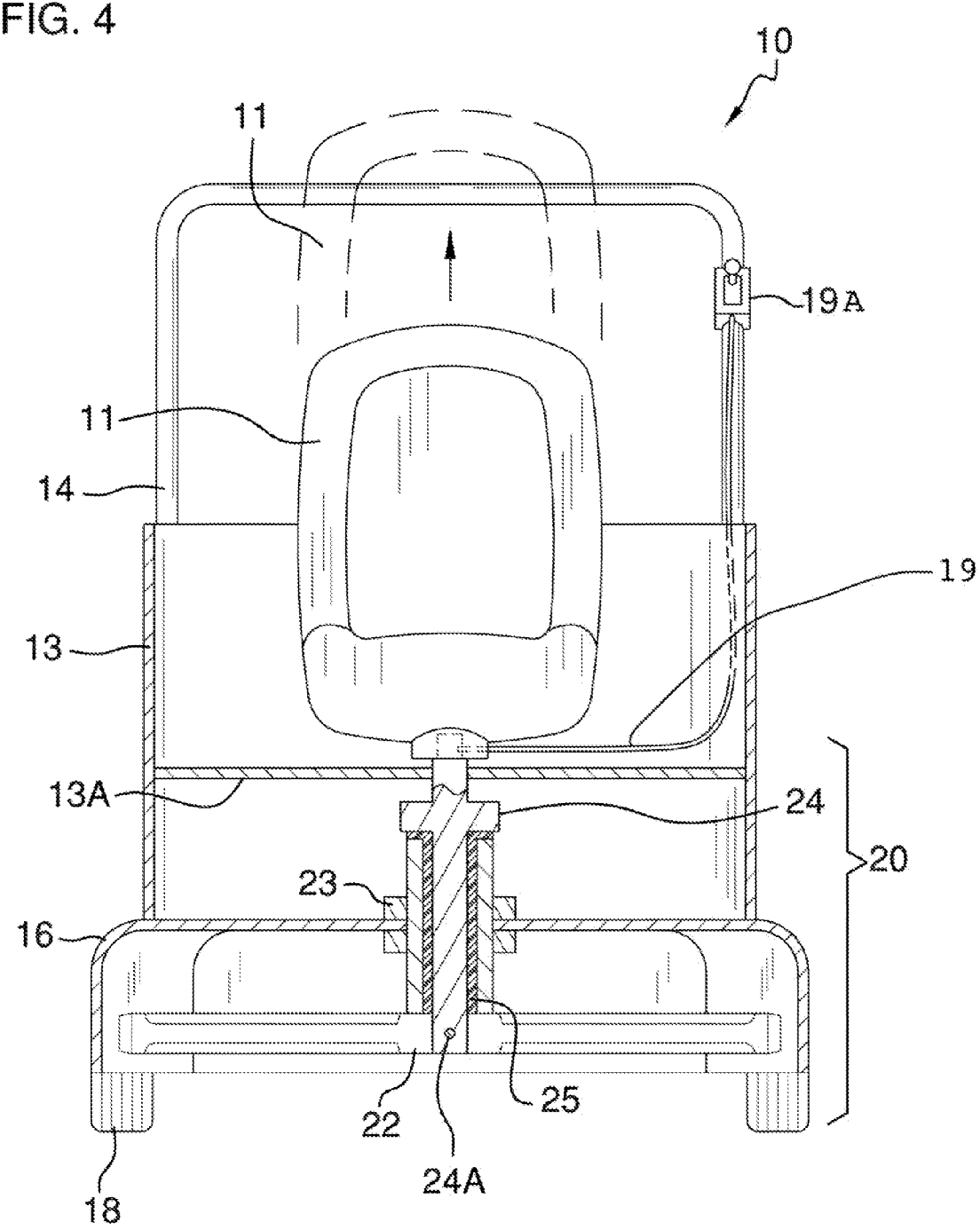
FIG. 4 illustrates a cross-sectional view of the baby stroller with rotating seat along line 4-4 in FIG. 1 and detailing the height adjusting means of the baby seat along with the seat release and rotating means.

Detailed reference will now be made to the preferred embodiment of the present invention, examples of which are illustrated in FIGS. 1-4. A baby stroller with rotating seat 10 (hereinafter invention) includes a baby seat 11, an umbrella 12, a cylindrical enclosure 13, a handle 14, a storage means 15, a deck 16, front wheels 17, rear wheels 18, seat release 19, and rotating means 20.

The baby seat 11 is attached to the rotating means 20 such that when engaged, the baby seat 11 will continuously rotate (either clockwise or counterclockwise) about a vertical axis with respect to the invention 10 as the invention 10 is pushed forwards or backwards. The seat release 19 adjusts the height of the baby seat 11, which can also engage or disengage the baby seat 11 with respect to the rotating means 20 (See FIG. 4).

The seat release 19 includes a cable that extends from the rotating means 20 down the handle 14 to a control arm 19A that controls the seat release 19 from behind the invention 10. The control arm 19A rotates to extend or retract the seat release 19.

The rotating means 20 is comprised of a rear axle 21 that is connected to the rear wheels 18. Both the rear wheels 18 and the rear axle 21 rotate about bearings 22 that are mounted on the deck 16. The rear axle 21 has a worm gear 21A integrated into the rear axle 21. A drive gear 22 is suspended below the deck 16, and is in connection with the worm gear 21A of the rear axle 21. As the invention 10 is pushed or pulled via the handle 14, the rear wheels 18, the rear axle 21, the worm gear 21A, and the drive gear 22 rotate accordingly. It shall be noted that the diameter of and number of gear teeth of the drive gear 22 is in a pre-determined portion to the worm gear 21A such that the baby seat 11 does not excessively rotate about the deck 16.

The rotating means 20 also includes a bearing 23 that enables the drive gear 22 to rotate about the deck 16. The seat release 19 is connected to a seat shaft 24, which selectively engages the drive gear 22 via a pin 24A (see FIG. 4) depending upon whether the baby seat 11 is raised or lowered. A bushing 25 is positioned between the seat shaft 24 and the drive gear 22.

The front wheels 17 are mounted to the deck 16 via a bolt and nut configuration 17A. The front wheels 17 involve caster wheels that enable 360 degrees of rotation about the deck 16. The deck 16 has front wheel enclosures 16A that encircle the front wheels 17 so as to insure separation of the rotating means 20 with respect to the front wheels 17.

The deck 16 is of thin construction, and encompasses the rotating means 20, the front wheels 17, and the rear wheels 18. The deck 16 is made of a material comprising a plastic, carbon fiber composite, or metal. The cylindrical enclosure 13 extends vertically from the deck 16. The handle 14 attaches to a rear portion of the deck 16.

The cylindrical enclosure 13 extends vertically from a top surface of the deck 16. The cylindrical enclosure 13 encircles the baby seat 11, and remains stationary while the baby seat 11 rotates therein. The cylindrical enclosure 13 has a floor 13A that encompasses, a top portion of the rotating means 20, with the exception of the seat release 19. The floor 13A insures that a child or infant (not shown) has a floor to rest his or her feet upon when seated in the baby seat 11. The cylindrical enclosure 13 provides clearance of the baby seat 11 with respect to both the cylindrical enclosure 13 and the umbrella 12. The cylindrical enclosure is made of a material comprising a metal, plastic, carbon fiber composite, or wood. The cylindrical enclosure extends vertically to a predetermined height that would be at equal elevation as the torso of a child or infant (not shown) when seated in the baby seat 11. The cylindrical enclosure acts effectively as a restraint to prevent the child or infant from falling off the invention 10 when in motion. However, it shall be noted that a safety belt (not shown, but well known in the art) maybe integrated into the baby seat 11.

The umbrella 12 extends from the deck 16 via a vertical member 12A. A horizontal member 12B extends from a top end of the vertical member 12A via a hinge 12C, and connects to the umbrella 12. The horizontal member 12B is capable of rotating (see FIG. 1) to tilt the umbrella 12 with respect to the baby seat 11 and in effect to provide varying angles of coverage from the elements when an infant or child (not shown) is seated therein.

The handle 14 connects to the deck 16 via a bracket 14A. The storage means 15 hangs from below the handle 14 and provides a place to store Items associated with the care of a child or infant (not shown).

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A baby stroller with rotating baby seat comprising:
a baby seat that is rotated about a vertical axis with respect to a baby stroller;
wherein the baby seat is rotated via a rotating means that rotates the baby seat in proportion to a travel speed of the baby stroller;
wherein as the baby stroller is propelled via a handle, the rotating means rotates the baby seat;
wherein a cylindrical enclosure encircles the baby seat, and wherein the cylindrical enclosure extends vertically from the baby stroller;
wherein the cylindrical enclosure has a floor that encloses the rotating means, and provides a floor upon which an end user rests his or her feet;
wherein the cylindrical enclosure is made of a material comprising a metal, wood, plastic, or carbon fiber composite.

2. The baby stroller with rotating baby seat as described in claim 1 wherein a seat release is attached to the rotating means, and engages or disengages the baby seat from the rotating means such that the baby seat may rotate or not rotate with respect to the baby stroller.

3. The baby stroller with rotating baby seat as described in claim 1 wherein an umbrella extends from the baby stroller to cover the baby seat from above; and wherein a vertical member is hingedly attached to a horizontal member that can rotate the umbrella with respect to the baby seat.

4. The baby stroller with rotating baby seat as described in claim 1 wherein the rotating means rotates the baby seat either clockwise or counterclockwise about the vertical axis with respect to the baby stroller.

5. The baby stroller with rotating baby seat as described in claim 1 wherein a storage means hangs from below the handle.

6. The baby stroller with rotating baby seat as described in claim 1 wherein the fastening means includes a rear axle that connects to rear wheels of the baby stroller; wherein the rear axle has a worm gear that is connection with a drive gear that when rotated and engaged with the baby seat rotates said baby seat.

7. The baby stroller with rotating baby seat as described in claim 1 wherein the baby stroller has front wheels that can rotate about the baby stroller.

8. A baby stroller with rotating baby seat comprising:
a baby seat that is rotated about a vertical axis with respect to a baby stroller;
wherein the baby seat is rotated via a rotating means that rotates the baby seat in proportion to a travel speed of the baby stroller;
wherein as the baby stroller is propelled via a handle, the rotating means rotates the baby seat;
wherein a seat release is attached to the rotating means, and engages or disengages the baby seat from the rotating means such that the baby seat may rotate or not rotate with respect to the baby stroller;
wherein the seat release extends from the rotating means to the handle; where said seat release is connected to a control arm located on said handle; wherein the control arm controls operation of the seal release from said handle;
wherein a cylindrical enclosure encircles the baby seat, and wherein the cylindrical enclosure extends vertically from the baby stroller;
wherein the rotating means rotates the baby seat either clockwise or counterclockwise about the vertical axis with respect to the baby stroller.

9. The baby stroller with rotating baby seat as described in claim 8 wherein the seat release adjusts the height of the baby seat with respect to the baby stroller.

10. The baby stroller with rotating baby seat as described in claim 8 wherein the cylindrical enclosure has a floor that encloses the rotating means, and provides a floor upon which an end user rests his or her feet.

11. The baby stroller with rotating baby seat as described in claim 10 wherein the cylindrical enclosure is made of a material comprising a metal, wood, plastic, or carbon fiber composite.

12. The baby stroller with rotating baby seat as described in claim 8 wherein an umbrella extends from the baby stroller to cover the baby seat from above; and wherein a vertical member is hingedly attached to a horizontal member that can rotate the umbrella with respect to the baby seat.

13. The baby stroller with rotating baby seat as described in claim 8 wherein a storage means hangs from below the handle.

14. The baby stroller with rotating baby seat as described in claim 8 wherein the fastening means includes a rear axle that connects to rear wheels of the baby stroller; wherein the rear axle has a worm gear that is connection with a drive gear that when rotated and engaged with the baby seat rotates said baby seat.

15. The baby stroller with rotating baby seat as described in claim 8 wherein the baby stroller has front wheels that can rotate about the baby stroller.

16. A baby stroller with rotating baby seat comprising:
a baby seat that is rotated about a vertical axis with respect to a deck of a baby stroller;
wherein the baby seat is rotated via a rotating means that rotates the baby seat in proportion to a travel speed of the baby stroller;
wherein as the baby stroller is propelled via a handle, the rotating means rotates the baby seat;
wherein a seat release is attached to the rotating means, and engages or disengages the baby seat from the rotating means such that the baby seat may rotate or not rotate with respect to the baby stroller;
wherein the seat release extends from the rotating means to the handle; where said seat release is connected to a control arm located on said handle; wherein the control arm controls operation of the seal release from said handle;
wherein a cylindrical enclosure encircles the baby seat, and wherein the cylindrical enclosure extends vertically from the deck;
wherein the rotating means rotates the baby seat either clockwise or counterclockwise about the vertical axis with respect to the baby stroller;
wherein the seat release adjusts the height of the baby seat with respect to the baby stroller;
wherein the cylindrical enclosure has a floor that encloses the rotating means, and provides a floor upon which an end user rests his or her feet;

wherein an umbrella extends from the baby stroller to cover the baby seat from above; and wherein a vertical member is hingedly attached to a horizontal member that can rotate the umbrella with respect to the baby seat;

wherein a storage means hangs from below the handle;

wherein the fastening means includes a rear axle that connects to rear wheels of the baby stroller; wherein the rear axle has a worm gear that is connection with a drive gear that when rotated and engaged with the baby seat rotates said baby seat; and wherein the baby stroller has front wheels that can rotate about the baby stroller.

17. The baby stroller with rotating baby seat as described in claim 16 wherein the deck and the cylindrical enclosure are made of a material comprising a metal, wood, plastic, or carbon fiber composite.

* * * * *